(No Model.)
J. M. KRAMPF.
APPARATUS FOR RECOVERING SAND USED IN GLASS GRINDING AND POLISHING.
No. 494,209. Patented Mar. 28, 1893.
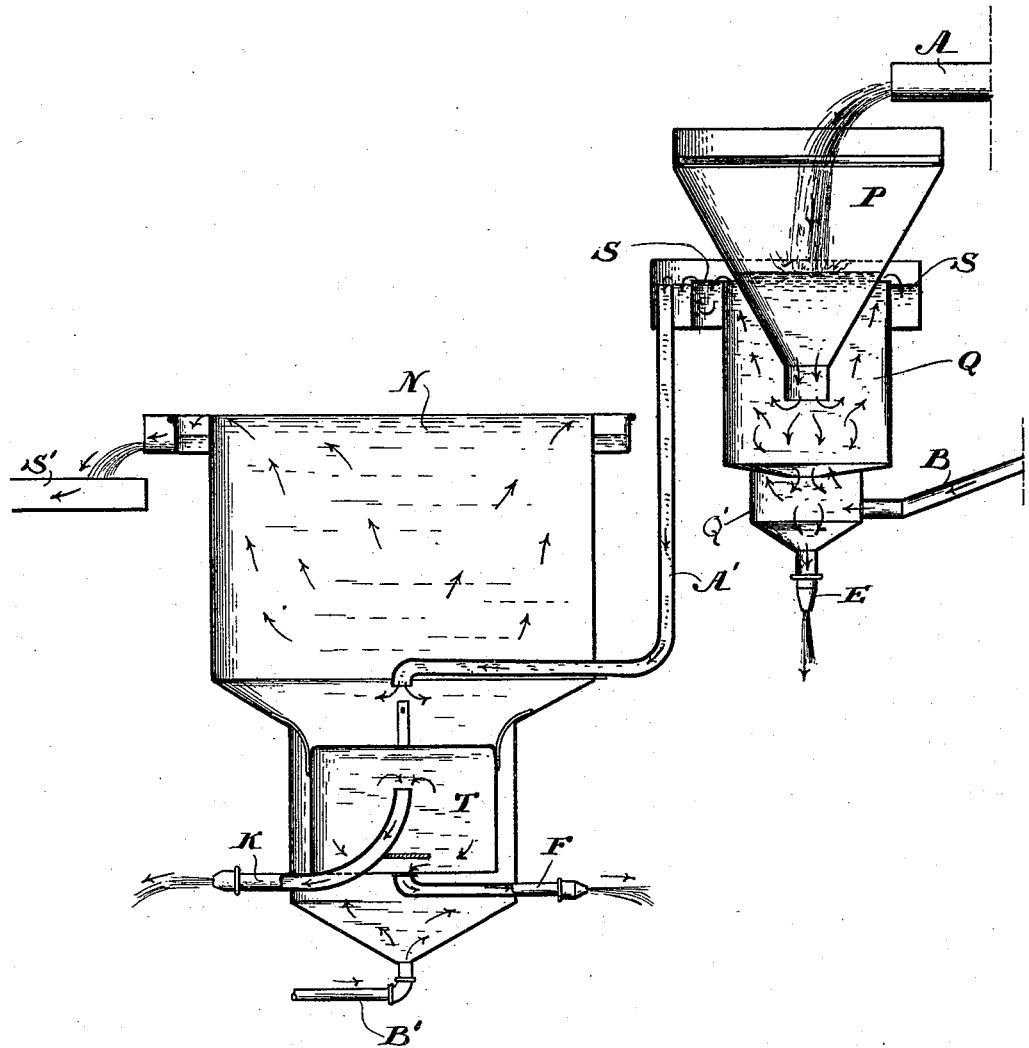
WITNESSES:
INVENTOR:

UNITED STATES PATENT OFFICE.

JOHN MARTIN KRAMPF, OF NEW ALBANY, INDIANA, ASSIGNOR TO THE W. C. DE PAUW COMPANY, OF INDIANA.

APPARATUS FOR RECOVERING SAND USED IN GLASS GRINDING AND POLISHING.

SPECIFICATION forming part of Letters Patent No. 494,209, dated March 28, 1893.

Application filed October 25, 1890. Serial No. 369,378. (No model.)

*To all whom it may concern:*

Be it known that I, JOHN MARTIN KRAMPF, residing at New Albany, county of Floyd, and State of Indiana, have invented a new and useful Apparatus for Recovering Sand Used in Glass Grinding and Polishing, of which the following is a full, clear, and exact description, reference being had to the accompanying drawing, which forms a part of this specification.

The water which passes from the grinder tables is highly charged with sand, which sand is of different grades of fineness, and it is very desirable to recover this sand and separate the different grades of sand.

My invention consists in an apparatus for carrying water charged with sand against a current of fresh water of sufficient volume and force that all but the largest grade of sand is carried off, the heaviest sand passing through the water into a receptacle, the lighter grades of sand (the heaviest having been removed as described) are carried by the water into a vessel where a fresh stream of water is caused to impinge upon it, of less force than the first stream of fresh water, and of such force that the heaviest remaining particles of sand will pass through it while the various grades of lighter sand pass out of the vessel at different levels dependent upon the degrees of fineness.

In the drawing:—A is the pipe leading from the glass grinding table, through which the water charged with sand is forced or carried into the vessel P, whence it passes into the vessel Q. A current of fresh water is forced through the pipe B so as to impinge against the incoming water and sand, and the force of this fresh water is such that only the coarsest sand will pass down through it and out the opening E at the bottom of the vessel Q' into a receptacle to receive it, making the diameter of vessel Q' small, as compared with that of vessel Q practically increases the force of the impinging water upon the contained mixed sand and water. The lighter particles of sand are carried up over the top of the vessel into the surrounding gutter S. The water charged with these lighter particles is carried into the separator N through pipe A'. At the bottom of this separator N is the vessel T, which is inclosed at side and top but open at bottom. Fresh water passes into this vessel T through the pipe B' and is partially stopped by vessel T and strikes against the mixed sand and water with less force than in the vessel Q, so that the heaviest remaining particles pass out through the pipe F to a proper receptacle, and the next coarser passing out through the pipe K. Above the vessel T the force of the incoming water is reduced to a minimum as a large volume of it is intercepted by the top of vessel T and only the lightest sand passes out over the top of the vessel into gutter S' S', whence it passes to a proper receptacle. The different grades of sand are allowed to settle in their respective boxes and can be used as needed for finishing the grinding of glass ready for polishing.

Any number of outlets may be placed in the separator, as I do not intend to limit myself to the specific number shown.

Having now fully described my invention, what I claim, and desire to protect by Letters Patent, is—

1. In an apparatus for separating sand, in combination, a pipe through which the mixed sand and water is carried, a funnel-shaped vessel into which said pipe feeds, a primary separating vessel surrounding the lower part of said funnel-shaped vessel, an outlet and an inlet in said vessel, a secondary separating vessel, connection between said primary and secondary vessels, an inlet pipe in the latter vessel, means for breaking the force of the current issuing from said inlet pipe, and outlets at different levels from said secondary vessel, all substantially as and for the purpose set forth.

2. In an apparatus for separating sand, in combination, a pipe through which said mixed sand and water is carried, a funnel-shaped vessel into which said pipe feeds, a primary separating vessel surrounding the lower part of said funnel-shaped vessel, a vessel beneath, and of smaller diameter than, the primary vessel, an outlet and an inlet in said lower vessel, a secondary separating vessel, connection between said primary and secondary vessels, an inlet pipe in the latter vessel, means for breaking the force of the current issuing from said inlet pipe, and outlets at different levels from said secondary vessel, all substantially as and for the purpose set forth.

3. In an apparatus for separating sand, in combination, a pipe through which said mixed sand and water is carried, a primary separating vessel into which said pipe feeds, an outlet and an inlet in said primary separator, a secondary separating vessel, connection between said primary and secondary vessels, an inlet pipe in the latter vessel, means for breaking the force of the current issuing from said inlet pipe, and outlets at different levels from said secondary vessel, all substantially as and for the purpose set forth.

In testimony of which invention I have hereunto set my hand.

JOHN MARTIN KRAMPF.

Witnesses:
JOHN W. LICH,
EBENEZER KNIGHT,
FRANK SHEFOLD.